INVENTOR.
JERRY E. BOOTHE
BY
Cushman, Darby Cushman
ATTORNEYS

Oct. 14, 1969   J. E. BOOTHE   3,472,740
PROCESS FOR PURIFYING DIALKYL DIALLYL AMMONIUM
CHLORIDE AND DIALKYL DIMETHALLYL
AMMONIUM CHLORIDE
Filed March 28, 1967   3 Sheets-Sheet 2

INVENTOR.
JERRY E. BOOTHE
BY
Cushman, Darby & Cushman
ATTORNEYS

United States Patent Office 3,472,740
Patented Oct. 14, 1969

3,472,740
PROCESS FOR PURIFYING DIALKYL DIALLYL AMMONIUM CHLORIDE AND DIALKYL DIMETHALLYL AMMONIUM CHLORIDE
Jerry E. Boothe, Pittsburgh, Pa., assignor, by mesne assignments, to Calgon Corporation, a corporation of Delaware
Filed Mar. 28, 1967, Ser. No. 626,501
Int. Cl. B01d 3/38
U.S. Cl. 203—37                15 Claims

ABSTRACT OF THE DISCLOSURE

An improved purification process for purifying dialkyl diallyl ammonium chloride and dialkyl dimethallyl ammonium chloride is disclosed. The compounds are purified by utilizing, in order, a vacuum stripping step, a steam stripping step at a regulated pH and an activated carbon treatment step. The dialkyl diallyl ammonium chloride compounds so purified may be polymerized to much higher molecular weight polymers than the corresponding monomers purified by prior art purification processes.

BACKGROUND OF THE INVENTION

Dialkyl diallyl ammonium chlorides are known compounds which may be prepared from the reaction of a dialkyl amine with an allyl chloride in the presence of an inorganic alkali such as sodium hydroxide. The prior art has used a process comprising adding a molecular equivalent of the allyl chloride to a molecular equivalent of an aqueous solution of the dialkyl secondary amine. A molecular equivalent of the alkali is then added under refluxing conditions. The solution is allowed to stand for an appreciable length of time, for example, 16 hours, and then two additional equivalent of the allyl chloride are added with refluxing of the resultant mixture for 5 to 15 hours. The synthesis reaction is considered complete when the pH has dropped below 5, and dialkyl diallyl ammonium chloride is recovered.

It has now been found, however, that the dialkyl diallyl ammonium chlorides produced by such prior art processes contains undesirable impurities and that the polymers prepared therefrom have undesirably low molecular weights. For example, high molecular weight dialkyl diallyl ammonium chloride polymers have exhibited outstanding utility as flocculants for water and sewerage treatment. However, the impure monomers produced by the prior art cannot be polymerized to polymers of high enough molecular weights to be used as flocculants.

OBJECTS OF THE INVENTION

It is an object of this invention to provide an improved process for the purification of dialkyl diallyl or dimethallyl ammonium chloride. It is a further object of this invention to provide an improved process for the purification of dimethyl diallyl ammonium chloride.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes or modifications within the scope of the invention will become apparent to those skilled in the art from this detailed description.

SUMMARY OF THE INVENTION

Thet present dialkyl diallyl and dimethallyl ammonium chloride purification process utilizes in order, a vacuum stripping step, a steam stripping step at a regulated pH, and a subsequent carbon treatment which is preferably a counter-current treatment. The vacuum stripping step and the carbon treatment have been taught by the prior art but the steam stripping step at a regulated pH has not been previously disclosed for dialkyl diallyl or dimethallyl ammonium chloride purification. This stream stripping step appears to remove impurities which are not removed from the monomers by the prior art purification processes, thereby allowing dialkyl diallyl ammonium chloride monomers to be polymerized to higher molecular weight polymers than previously possible.

DESCRIPTION OF THE INVENTION

As previously mentioned, the purity of dialkyl diallyl ammonium chloride monomers is extremely critical when monomer is to be subsequently polymerized. For example, the purity of the dialkyl diallyl ammonium chloride monomers produced by the prior art, even with certain prior art purification steps (such as disclosed in U.S. Patent No. 2,923,701), is such that only homopolymers and copolymers of low molecular weight can be produced. Even when extreme care is taken to minimize the production of by-products the monomer has been found to be of erractic quality and unsuitable for polymerization to high molecular weight products. The present purification process, on the other hand, produces a dialkyl diallyl ammonium chloride monomer which can be polymerized into polymers of high molecular weights, which polymers have desired properties that cannot be obtained by the lower molecular weight polymers produced from the impure monomers of the prior art.

The invention will be more clearly understood with reference to the accompanying drawings, wherein—

Figure 1:
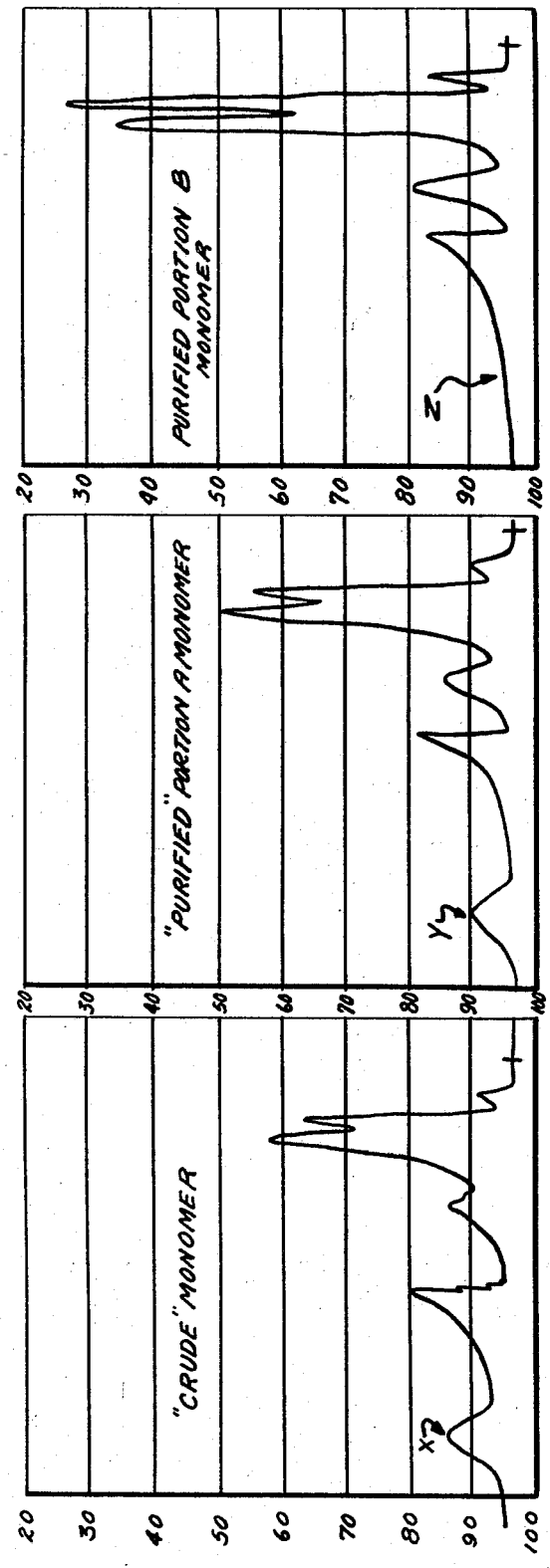
FIGURE 1 represents gas chromatography curves obtained on (a) unpurified or "crude" DMDAAC monomer, (b) DMDAAC monomer "purified" according to the prior art, (c) DMDAAC purified according to the present invention.

The dialkyl diallyl or dimethallyl ammonium chloride monomers which are purified by the present invention may have 1 to 18 carbon atoms in each alkyl group, and are of the following general formula:

$$\begin{array}{cc} CH_2 & CH_2 \\ \parallel & \parallel \\ CR_3 & CR_3 \\ | & | \\ CH_2 & CH_2 \\ & \diagdown N \diagup \\ R_1 & R_2 \end{array} \quad \text{Formula I}$$

wherein $R_1$ and $R_2$ are independently selected from alkyl groups of 1 to 18 carbon atoms and $R_3$ is H or methyl. Perferably, $R_3$ is H, and $R_1$ and $R_2$ are both methyl.

As examples of the alkyl groups may be mentioned, methyl, ethyl, propyl, isopropyl, n-, s-, and t-butyl, pentyl, 2-ethyl hexyl, octyl, dodecyl and octadecyl. While the diallyl compounds are preferred, the dimethallyl compounds of Formula I may also be purified by the present process. For conveinence, the compounds purified by the present invention, i.e., the compounds of Formula I, will hereinafter be referred to simply as dialkyl diallyl ammonium chloride compounds.

The dialkyl dimethallyl ammonium chloride purified by the process of the present invention has not been polymerized to high molecular weight polymers. However, the purification process removes many impurities and produces a crystal clear monomer solution, thereby proving superior to the prior art purification processes.

After a conventional vacuum stripping step, e.g., at 29 inches Hg vacuum, dialkyl diallyl ammonium chloride solution is heated to its boiling point and an appropriate pH indicator is added. An inorganic alkali is added to the hot monomer solution until the desired pH range of about 6 to 13, preferably 10.5 to 11.5, has been reached. Steam is injected, with distillate removal. During steam injection additional inorganic alkali is added, as required, to keep the pH within the desired range. The steam injection or distillation is continued until the distillate is essentially pure water—e.g., until the pH of the distillate is neutral and the distillate refractive index matches that of pure water. At this point, the steam injection or distillation is discontinued, the monomer is optionally adjusted to a desired concentration by the addition of water, and then allowed to cool to room temperature.

After the steam distillation step, the monomer is treated with activated carbon. Preferably, the monomer is passed through a column of activated carbon. Although any activated carbon may be used in this particular purification step, the preferred carbon is Pittsburgh Activated Carbon SGL. The treatment level of activated carbon may vary from a level of 5 to 200 lbs. of monomers per pound of carbon, but a treatment level of about 50 lbs. of monomer per pound of carbon has been found preferable.

Although the concentration of the DMDAAC or other dialkyl diallyl ammonium chloride in the aqueous solution used as a starting material for the purification process may vary from 5 to 85% by weight, the preferred concentration is approximately 65%. Phenylphthalein is the preferred pH indicator, and may be used, for example, at a level of about 0.1 gram per gram of pure monomer, or in much smaller or in much greater levels. In a boiling 65% aqueous solution of DMDAAC, phenylphthalein changes color at 520 to 580 millivolts as measured on a L & N pH meter, which change corresponds to a pH scale reading of about 10.5 to 11.5 uncorrected. While any inorganic alkali which does not react with the dialkyl allyl ammonium chloride, i.e., an inert inorganic alkali, may be used to adjust the pH of the system, a 5% sodium hydroxide solution has been found to be the preferred means of pH adjustment. The NaOH solution can vary in concentration from .01 to 70% by weight. The steam distillation may be at subatmospheric pressure or superatmospheric pressures, but preferably the distillation is at about atmospheric pressure.

The dialkyl diallyl ammonium chloride monomer purified by the present purification process can be polymerized to higher molecular weight homopolymers or copolymers than the monomers produced by the prior art.

Example I.—Dimethyl diallyl ammonium chloride

*Comparison with the prior art process.*—A comparative test of the purification process of the present invention and that disclosed by U.S. Patent No. 2,923,701 was performed to illustrate the great improvement in monomer purity achieved by the present invention.

*Monomer preparation.*—Using the DMDAAC synthesis process disclosed in U.S. Patent No. 2,923,701, at a 3:1:1 molar ratio of allyl chloride:caustic:dimethylamine, a 5 mole batch was prepared as follows:

To a three-liter flask equipped with stirrer, Dewar condenser filed with Dry Ice acetone, thermometer, and addition funnel, was added 563 g. (5 moles) of 40% dimethyl amine. Three hundred seventy-five g. (4.9 moles) of allyl chloride was added with vigorous stirring at a rate governed by the rate of reflux. This first addition required eighty-five minutes. The maximum temperature attained was 50° C. Eight hundred g. of 50% aqueous sodium hydroxide was added in seventy-five minutes.

The maximum temperature was 50° C. during this step. The resulting mixture was allowed to stand at room temperature sixteen hours. Seven hundred seventy-three g. (10.0 moles) of allyl chloride was added and the mixture refluxed at 46° C. for six and one-half hours. The pH of this final pale yellow solution was 1.5. The vapors given off, when a sample of this solution adjusted to a pH of 9.5 was boiled, were distinctly basic to wet pHydrion paper. The reaction mixture was stripped in vacuum and then diluted to approximately 36% by the addition of 520 g. of water. The resulting solution contained by analysis 14.0% chloride and 4% sodium ion. This corresponds to 10.2% sodium chloride and 35.7% DMDAAC.

This monomer solution was then divided into two portions, a portion A and a portion B. The A portion was treated according to U.S. Patent No. 2,923,701 as set forth below:

*Treatment of portion A (according to prior art).*—The diluted 36% monomer solution (500 grams) was treated with 1% of activated carbon (5 grams) for 16 hours and was then filtered to remove the carbon. An analysis of the filtrate showed that the solution was unchanged in composition from the above, but the carbon removed some of the color.

*Treatment of portion B (according to this invention).*— Portion B of the monomer solution was steam distilled and carbon treated in accordance with the present invention by the following procedure:

Phenylphthalein indicator (0.2 gram) was added to the diluted 36% monomer solution (500 grams) in a three-neck flask equipped with a distillation apparatus, thermometer, addition funnel, and steam injection tube. The solution was heated to 110° C. and steam was injected. Sodium hydroxide solution (5%) was added to maintain a slight pink color (uncorrected pH meter reading 10.5–11.5). This process was continued until the refractive index of the distillate was equal to that of water. After cooling, the solution was passed through activated carbon (300 grams) in a column (1¼″ diameter). The treated solution was then filtered to remove carbon fines.

This final solution was completely colorless and the analysis was unchanged.

*Polymerization of the treated monomer portions A and B.*—The separate treated monomer solutions were then polymerized using the following procedure:

Two hundred thirty-one g. of each solution (½ mole) adjusted to a pH of 6.5 was purged for one hour at 80° C. with nitrogen. 5.7 g./100 ml. of $(NH_4)_2S_2O_8$ was pumped into the solution at 0.1 ml./min. for 100 minutes. The solution was held above 80° C. for ½ hour. The reaction was then terminated.

It is known that the higher the molecular weight of DMDAAC polymers, the better are the values which will be observed in tests of properties such as viscosity, floc time and electrical resistivity. Thus, the performance of polymers in such tests is an index of the quality of the starting monomer. Measurements of the viscosity, floc time and electrical resistivity were made to determine certain characteristics of polymer A and polymer B, produced respectively from monomer portion A and monomer portion B. It will be seen from Tables I to III below, the results in each of these tests demonstrate that the purified monomers of the present invention produce polymers of decidedly superior properties.

TABLE I.—VISCOSITY IN AQUEOUS SOLUTION

| Sample | Concentration (cps.) | |
|---|---|---|
| | 5% | 35% |
| Polymer A | 3.2 | 20 |
| Polymer B | 6.0 | 390 |

TABLE II.—ELECTRICAL RESISTIVITY (18% RELATIVE HUMIDITY), OHMS/cm.²

| Sample | |
| --- | --- |
| Polymer A | 8.2×10¹¹ |
| Polymer B | 9.1×10¹⁰ |

TABLE III.—FLOC TIME TEST

| Sample | Floc time (min.) | Dose (p.p.m.) |
| --- | --- | --- |
| Polymer A | 62' | 2.000 |
| Polymer B | 24'30" | 0.625 |

To further illustrate the surprising effectiveness of the present invention in purification of DMDAAC and other dialkyl diallyl ammonium chloride monomers, the FIGURE 1 illustrates gas chromatography curves obtained on the following DMDAAC monomer samples:

(1) Unpurified or "crude" DMDAAC monomer as produced by the "monomer preparation" process.
(2) "Purified" portion A DMDAAC monomer.
(3) Purified portion B DMDAAC monomer.

It will be seen that the purified portion B monomer (that is the DMDAAC monomer produced according to the present invention) is quite different from the "crude" monomer and from the portion A monomer which was treated according to the prior art purification process.

For instance, the areas noted at point X for the crude monomer and point Y for the "purified" portion A monomer each have an absorption peak indicating the presence of allyl alcohol. It does not appear that the prior art purification method was substantially effective in removing allyl alcohol; however, the process of the present invention, as seen from point Z on the curve for purified portion B monomer, has successfully eliminated this difficult impurity.

Further, the relative height of the strong double peaks at the right of the respective curves is significantly reversed in the purified portion B monomer (produced according to the present invention) as compared to that shown for both the "crude" monomer and the prior art "purified" portion A monomer.

It is not presently known exactly what has produced this latter change in absorption characteristics, but the gas chromatography curves do signify that a substantial change of some sort has occurred. This change is probably related to the greatly improved polymerization characteristic noted above for the monomers produced by the process of the present invention. While the present invention is not to be limited to any particular theory, it appears that the steam distillation step of the present invention removes certain impurities from the monomer, and that these impurities are not removed by the prior art processes.

Example II.—Diethyl diallyl ammonium chloride

Using a monomer synthesis similar to that of Example I and U.S. Patent No. 2,923,701, diethyl diallyl ammonium chloride was prepared by reacting diethyl amine, allyl chloride and a 50% aqueous solution of sodium hydroxide at a molar ratio of 1:2.25:1, respectively. The reaction was conducted in a sealed, stirred vessel at 82° C. and 80 p.s.i. for approximately four and one-half hours. The resulting solution was stripped under vacuum at 30° C. to remove any unreacted allyl chloride and then the solution was filtered to remove precipitated salt.

The monomer solution was divided into two portions, a portion C and a portion D. Portions C and D were treated in the same manner as portions A and B, respectively, in Example I. Portion C was "purified" by treatment with activated carbon. Portion D was purified using steam distillation and activated carbon treatment. Gas chromatographic analysis shows no allyl alcohol in portion D, although allyl alcohol was found to be present in portion C. Analysis of the steam distillate from the treatment of portion D shows the presence of diethyl allyl amine, although this compound does not show up in the chromatographs of the monomer solutions.

The treated monomer portions C and D were polymerized in the same manner as was used in Example I, although 75% monomer concentration was used. Portion C remained essentially unchanged and had a Brookfield viscosity of 8 cps. at 39.5% solids whereas portion D produced a polymeric product with a Brookfield viscosity of 136,000 cps. at 39.5% solids.

Figure 3:
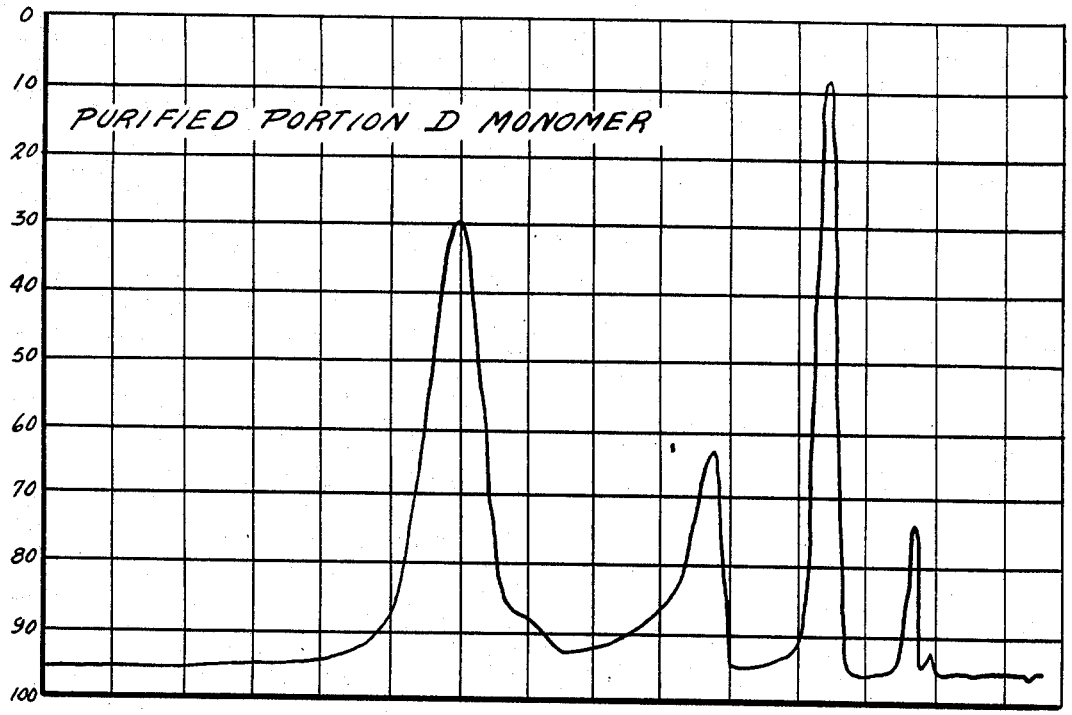
FIGURE 3 represents a gas chromatography curve for diethyl diallyl ammonium chloride purified according to the present invention.
Figure 2:
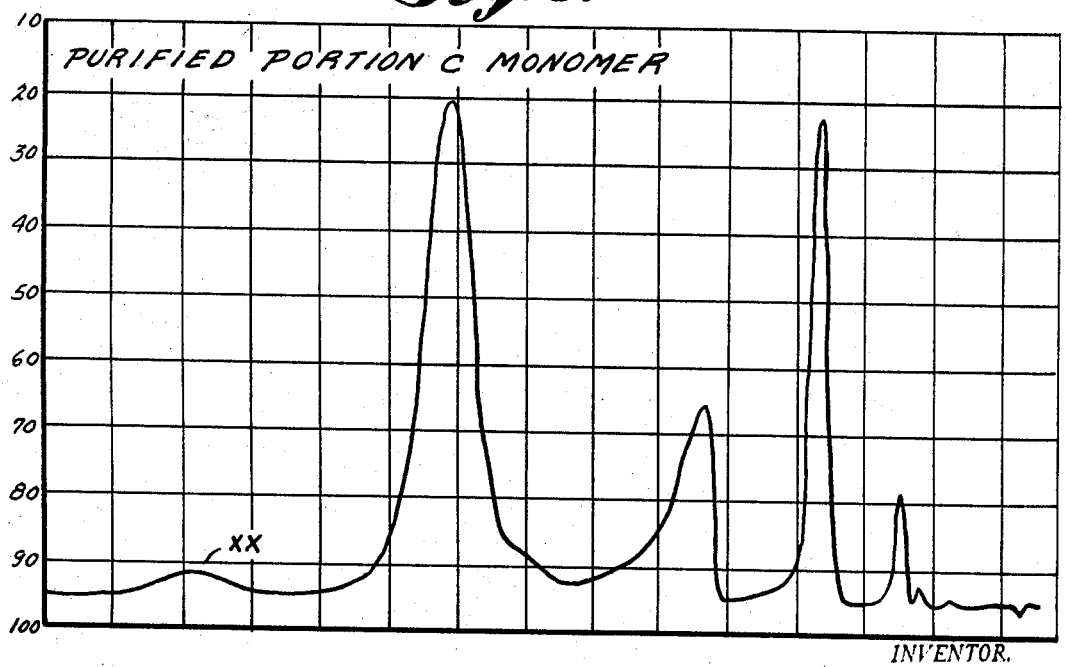
FIGURE 2 represents a gas chromatography curve for diethyl dialkyl ammonium chloride "purified" according to the prior art.
Figure 4:
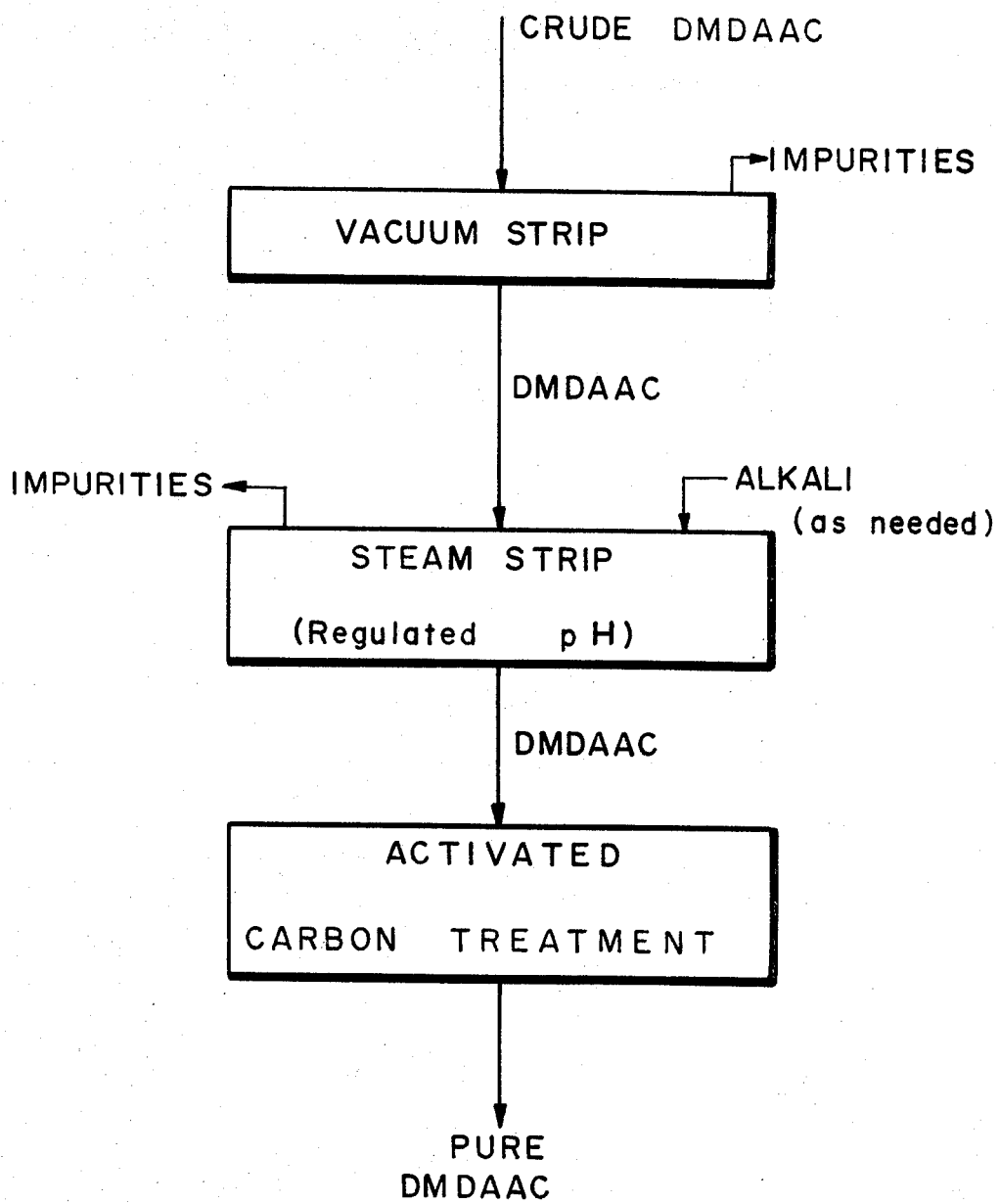
FIGURE 4 represents a schematic flow diagram of the process of the present invention.

FIGURES 2 and 3, respectively, illustrate gas chromatographic curves obtained on "purified" portion C and purified portion D monomers, and demonstrates the removal of impurities from portion D. It will readily be seen that the portion of the curve in the area of point XX of the curve of portion C shows a hump indicating the presence of an impurity not shown on the corresponding area of the curve of portion D monomers at point ZZ.

In addition, the curve for purified portion D illustrates significant changes in the heights of the two major peaks, with the left major peak lowered and the right major peak raised, as compared to the curve for portion C. Again, the exact significance of the changes in the gas chromatographic curves is unknown, but the results do demonstrate that a substantial change in the monomer solutions has occurred.

Example III.—Methyl dodecyl diallyl ammonium chloride

Methyl dodecyl diallyl ammonium chloride was prepared by reacting methyl chloride with dodecyl diallyl amine in the molar ratio of 1.25/1. The dodecyl diallyl amine plus enough water to give a 60% quaternary solution were added to a pressure reactor and after 9 hours of reaction with methy chloride at 180° F. and 98 p.s.i., a homogeneous solution of the desired quanternary was obtained. The solution was stripped under vacuum at 70° F. to remove the excess methyl chloride.

The methyl dodecyl diallyl ammonium chloride solution was adjusted to pH 8.5 with 20% sodium hydroxide. An upper amine layer formed which separated from the solution.

A 50.7% quaternary solution (3098 grams) was steam distilled at pH 8.5 for 8 hours, after which a 51.8% solution (2885 grams) was recovered giving a 96.6% yield. This steam stripped solution contained no allyl alcohol as verified by gas chromatographs of a series of samples.

The steam stripped solution was diluted with distilled water (2100 grams) to give a 30% quaternary solution. This solution was passed through an activated carbon column to give a clear, colorless, 29.4% solution (3846 grams) of the fatty quaternary or a 75.7% yield.

This purified monomer was copolymerized with dimethyl diallyl ammonium chloride purified according to Example I at 55% monomer concentration to give a polymeric product with a Brookfield viscosity at 25° C. of 117,000 cps. for a 40% solution. A similar monomer solution containing impure methyl dodecyl diallyl ammonium chloride failed to polymerize to any appreciable degree under equal conditions.

While the present purification process is preferably used to purify a single dialkyl diallyl ammonium chloride or single dialkyl dimethallyl ammonium chloride compound, in certain instances the process may be advantageously utilized to purify a mixture of compounds. For instance, considerable interest has been developed in copolymers of dimethyl diallyl ammonium chloride and other dialkyl diallyl ammonium chlorides. In the preparation of such copolymer, the monomer solutions may be combined prior to the purification process, thereby resulting in the purification of a solution containing a mixture of such compounds.

Obviously, many modifications and variations of the present invention are possible in the light of the above teachings. It is, therefore, to be understood that within the scope of the appended claims, the invention may be practiced otherwise than as specifically described.

What is claimed is:

1. A process for purifying at least one compound selected from the group consisting of dialkyl diallyl ammonium chloride and dialkyl dimethallyl ammonium chloride, wherein each alkyl group independently contains from 1 to 18 carbon atoms, said process comprising the steps of vacuum stripping more volatile impurities from a solution of said compound to produce a vacuum stripped solution of said compound, and thereafter contacting the vacuum stripped solution of said compound with activated carbon, the improvement consisting essentially of, intermediate the vacuum stripping step and the activated carbon contacting step, the further step of steam distilling impurities from said vacuum stripped solution of said compound, while maintaining the pH of said solution of said compound within the range of about 6 to 13 by the addition of an inorganic alkali.

2. The process as claimed in claim 1 wherein said compound is a dialkyl diallyl ammonium chloride.

3. The process as claimed in claim 2 wherein said dialkyl diallyl ammonium chloride is diethyl diallyl ammonium chloride.

4. The process as claimed in claim 2 wherein said dialkyl diallyl ammonium chloride is methyl dodecyl diallyl ammonium chloride.

5. The process as claimed in claim 2 wherein said dialkyl diallyl ammonium chloride is dimethyl diallyl ammonium chloride.

6. The process as claimed in claim 2 wherein the steam distillation of the dialkyl diallyl ammonium chloride is continued until the distillate is essentially water.

7. The process as claimed in claim 2 wherein the pH maintained during the steam distillation is in the range of about 10.5 to 11.5.

8. The process as claimed in claim 2 wherein said inorganic alkali is sodium hydroxide.

9. A process for purifying dialkyl diallyl ammonium chloride, wherein the alkyl groups independently contain from 1 to 18 carbon atoms, said process consisting essentially of the combination of the steps, in order, of (a) vacuum stripping more volatile impurities from a solution of the dialkyl diallyl ammonium chloride to produce a vacuum stripped solution of dialkyl diallyl ammonium chloride (b) thereafter distilling impurities from the vacuum stripped solution of dialkyl diallyl ammonium chloride by steam injection, while maintaining the pH of the dialkyl diallyl ammonium chloride solution within the range of 6 to 13 by the addition of at least one inorganic alkali to produce a purified solution of dialkyl diallyl ammonium chloride and (c) contacting the distilled dialkyl diallyl ammonium chloride solution with activated carbon, whereby dialkyl diallyl ammonium chloride which can be polymerized to higher molecular weight polymers is obtained.

10. The process as claimed in claim 9 wherein the dialkyl diallyl ammonium chloride is dimethyl diallyl ammonium chloride.

11. The process as claimed in claim 9 wherein the dimethyl diallyl ammonium chloride is steam distilled until the distillate is essentially water.

12. The process as claimed in claim 10 wherein the pH of the dimethyl dialkyl ammonium chloride during steam distillation is 10.5 to 11.5.

13. The process as claimed in claim 10 wherein the inorganic alkali is sodium hydroxide.

14. The process as claimed in claim 9 wherein the dialkyl diallyl ammonium chloride is diethyl diallyl ammonium chloride.

15. The process as claimed in claim 9 wherein the dialkyl diallyl ammonium chloride is methyl dodecyl diallyl ammonium chloride.

References Cited
UNITED STATES PATENTS 2,454,547  11/1948  Bock.
2,923,701   2/1960  Schuller et al. _____ 260—85.5
3,148,214   9/1964  Smith.

WILBUR L. BASCOMB, Jr., Primary Examiner

U.S. Cl. X.R.

203—41, 79, 80, 91, 92, 96; 260—85.5, 567.6